United States Patent [19]

Wickenberg

[11] 4,273,268

[45] Jun. 16, 1981

[54] FLUID SPRAY PUMP

[75] Inventor: Chester Wickenberg, Elgin, Ill.

[73] Assignee: Seaquist Valve Co., Div. of Pittway, Cary, Ill.

[21] Appl. No.: 56,438

[22] Filed: Jul. 11, 1979

Related U.S. Application Data

[63] Continuation of Ser. No. 860,233, Dec. 13, 1977, abandoned.

[51] Int. Cl.³ .............................................. G01F 11/02

[52] U.S. Cl. ..................................... 222/321; 222/383

[58] Field of Search ............... 222/321, 340, 341, 383, 222/385, 320; 239/333, 359, 526

[56] References Cited

U.S. PATENT DOCUMENTS

| | | | |
|---|---|---|---|
| 3,463,093 | 8/1969 | Pfeiffer et al. | 222/321 X |
| 3,627,206 | 12/1971 | Boris | 222/385 X |
| 3,701,478 | 10/1972 | Tada | 239/333 |
| 4,029,261 | 6/1977 | Olegnowicz | 222/385 X |

FOREIGN PATENT DOCUMENTS

| | | |
|---|---|---|
| 1181203 | of 1968 | United Kingdom . |
| 1328326 | of 1972 | United Kingdom . |
| 1445258 | of 1974 | United Kingdom . |
| 1488790 | of 1976 | United Kingdom . |

*Primary Examiner*—Stanley H. Tollberg
*Attorney, Agent, or Firm*—Stein & Frijouf

[57] ABSTRACT

An improved fluid spray pump is disclosed for spraying a fluid from a fluid container through a terminal orifice comprising a housing having an internal cylinder with a first and a second end. A collar with an internal collar aperture is mounted adjacent the first end of the housing internal cylinder. A pump barrel is slidably received in the internal collar aperture and includes a barrel internal bore communicating with a terminal orifice in the pump barrel. A piston comprising a piston stem is received in the barrel internal bore of the piston barrel and with a piston head received within the housing internal cylinder. Channels are provided along the piston stem for communicating the housing internal cylinder with the terminal orifice. An annular seal is slidably mounted relative to the piston and the pump barrel for sealing the channel means when the annular seal abuts a shoulder formed between the piston head and the piston stem. The annular seal enables fluid flow through the channel means to the terminal orifice when the annular seal is displaced from the piston shoulder by movement of the pump barrel toward the second end of the housing internal cylinder.

20 Claims, 12 Drawing Figures

FLUID SPRAY PUMP

This is a continuation of application Ser. No. 860,233, filed Dec. 13, 1977 now abandoned.

BACKGROUND OF THE INVENTION

1. Field of the Invention

The invention relates to fluid spray pumps and more particularly to finger operated fluid spray pumps.

2. Description of the Prior Art

Hand operated pumps have been widely used in the prior art for a variety of substances and applications. A segment of this prior art comprises hand or trigger action pumps wherein the pump motion is supplied by the index or "trigger" finger of the operator. Accordingly, these pumps are generally referred to in the trade as trigger action pumps. The term trigger action pump as set forth herein includes both linear and pivotal movement of a trigger actuator in addition to vertical angular or horizontal piston movement.

The prior art trigger action pumps have been used for dispensing and pumping a large variety of fluids, generally liquids. Many products were sold within a container having a trigger action pump for dispensing the product by the consumer. Cleaning preparations and the like were one of the most popular products sold in containers having a trigger action pump. Most other products for example, sprayed deodorant, paints, insecticides and the like were normally sold in aerosol containers having a freon propellant. With the increased investigation of the environmental impact of freon propellants, these industries have again looked toward the trigger action pump as a possible solution for providing the consumer with the convenience of an aerosol product while complying with environmental regulations.

Unfortunately, the trigger action pumps of the prior art were not capable of replacing aerosol containers. The prior art trigger action pumps either lacked proper performance or lacked the reliability demanded by the consumer and the manufacturer of the fluid product. The trigger action pumps in the prior art that were able to provide proper performance were generally difficult to manufacture thus substantially raising the cost of the product.

There is a need in the art for a trigger action pump which is suitable for replacing many of the applications heretofor satisfied by aerosol containers having freon propellants.

Therefore it is an object of this invention to provide an apparatus which overcomes the aforementioned inadequancies of the prior art devices and provides an improvement which is a significant contribution to the advancement of the pump art.

Another object of this invention is to provide a trigger action pump for pumping a fluid from a fluid container which has spraying characteristics equivalent to aerosol containers with a minimal amount of drip at the beginning and termination of the trigger stroke.

Another object of this invention is to provide a trigger action pump for pumping a fluid from a fluid container which is easy to operate with a minimum amount of finger pressure and is capable of pumping a variety of fluids without manufacturing change.

Another object of this invention is to provide a trigger action pump for pumping a fluid from a container which pump may be readily assembled from easily molded plastic parts resulting in a reliable and rugged pump at relatively low cost.

Another object of this invention is to provide a trigger action pump for pumping a fluid from a container having an annular seal slidably mounted for sealing channels in a piston stem when the annular seal abuts a piston shoulder and for enabling fluid to flow through the channels when the annular seal is displaced from the piston shoulder.

Another object of this invention is to provide a trigger action pump for pumping a fluid from a fluid container comprising a housing, a collar, a pump barrel, a piston and an annular seal with a spring coacting between the piston and the housing for abutting the annular seal between the collar and the piston for sealing the container, to prevent accidental dispensing of the fluid during shipment.

Other objects and a fuller understanding of this invention may be had by referring to the summary of the invention, the description and the claims, taken in conjunction with the accompanying drawings.

SUMMARY OF THE INVENTION

The invention may be incorporated into a pump primarily adapted for pumping a fluid from a fluid container comprising a housing having a housing internal cylinder with a first and a second end. A collar is established adjacent the first end of the housing internal cylinder for providing a collar internal aperture. A one way valve connects the fluid container to the housing internal cylinder. A pump barrel is slidably received in the internal collar aperture and includes a terminal orifice. A piston comprising a piston head is receivable in the housing internal cylinder with the piston having channel means for communicating the housing internal cylinder with the terminal orifice. An annular seal is slidably mounted between a first and a second position for sealing the channels when the annular seal is in the first position and for enabling fluid flow through the channels when the annular seal is in the second position.

More specifically, without restricting the scope of the invention, the pump may include a collar shoulder in proximity to the first end of the housing internal cylinder formed by the internal collar aperture having a cross-sectional area less than the cross sectional area of the housing internal cylinder. The pump barrel includes a barrel internal bore communicating with the terminal orifice of the pump barrel. The piston comprises a piston stem and an enlarged piston head with the piston stem being receivable in the barrel internal bore of the piston barrel and with the pump head being receivable in the housing internal cylinder. The piston head forms a piston shoulder in proximity to the junction of the piston head and the piston stem. The channel means may comprise a plurality of grooves extending into the outer surface of the piston stem and equally distributed thereabout. The annular seal is slidably mounted for sealing the channel when the annular seal abuts the piston shoulder. The annular seal enables fluid to flow through the channels when the annular seal is displaced from the piston shoulder. Bias means which may include a spring coacting between the piston and the second end of the housing internal cylinder, biases the piston toward the first end of the housing internal cylinder to abut the annular seal means between the collar shoulder and the piston shoulder. A cylindrical recess may be established at the second end of the housing with the piston head having a substantially cylindrical recess facing the second end of the housing internal cylinder. The spring is receivable within the recesses for biasing the piston toward the first end of the housing internal cylinder. It should be understood that either of the recesses may be replaced by a flat surface or a projection extending within the central part of a coil spring for positioning the spring between the piston and the housing.

Trigger means is mounted relative to the pump barrel for sliding the pump barrel toward the second end of the housing internal cylinder thereby displacing the annular seal from the piston shoulder to pump the fluid through the terminal orifice. The trigger may be mounted for linear movement in accordance with the linear movement of the pump barrel or may be pivotably mounted relative to the housing for providing substantially linear movement to the pump barrel upon pivotable movement of the trigger.

The annular seal in one embodiment appears in the form of a sleeve with a sealing member extending radially outwardly at one end thereof with the sleeve being at least partially received within an annular seal bore of the pump barrel. Stop means establishes the position of the piston relative to the pump barrel for movement in unison upon action of the trigger. The annular seal bore of the pump barrel enables the annular seal means to slide relative to the pump barrel and the piston to provide fluid communication between the housing internal cylinder and the terminal orifice only upon movement of the pump barrel in the direction toward the second end of the housing internal cylinder. The annular seal seals the channels upon movement of the pump barrel in the direction toward the first end of the housing internal cylinder. During this movement, the annular seal abuts the piston shoulder for sealing the channel means.

Alternatively, the annular seal may comprise an O-ring slidably mounted relative to the pump barrel in the piston for providing fluid communication between the housing internal cylinder and the terminal orifice when the O-ring is displaced from the piston shoulder for sealing the channel means upon the O-ring abutting the piston shoulder formed at the junction of the piston head and the piston stem.

This invention accordingly comprises an apparatus possessing the features, properties and the relation of elements which will be exemplified in the apparatus hereinafter described, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION

Figure 1:
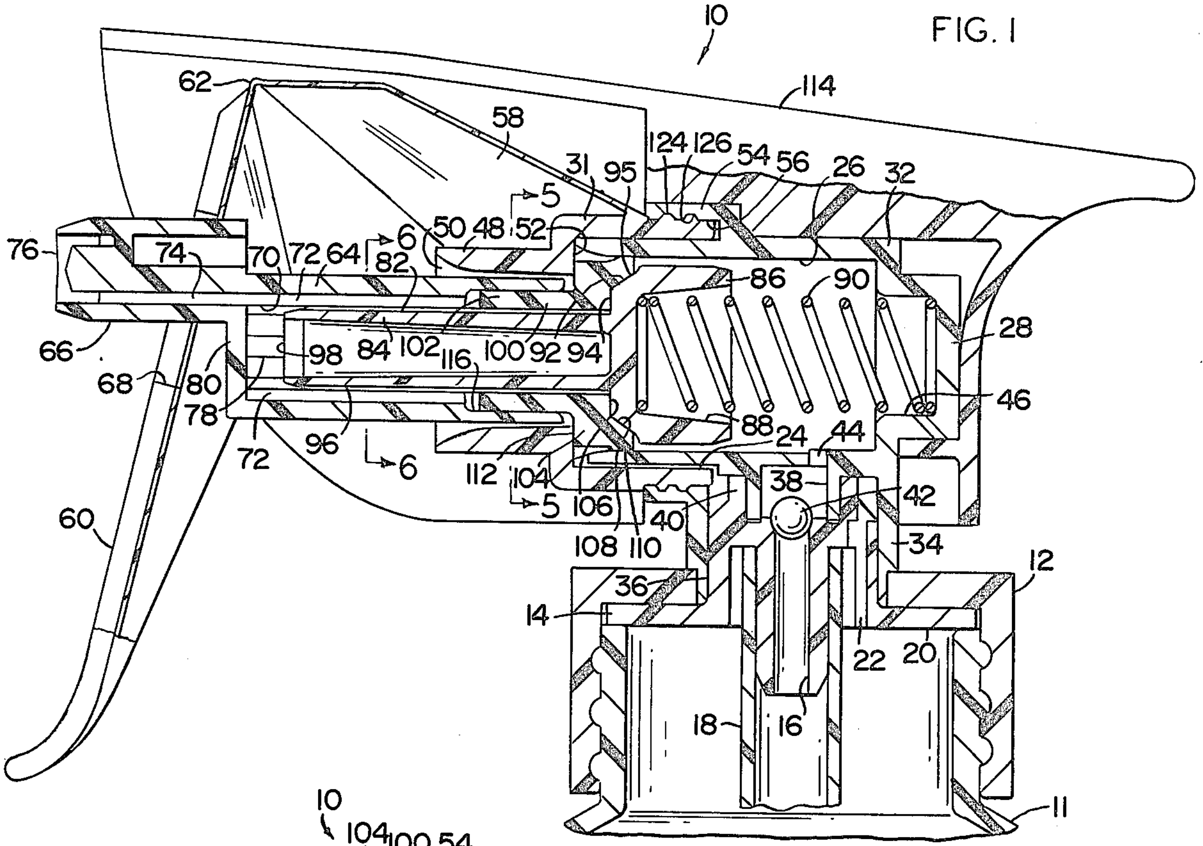
FIG. 1 is a side sectional view of the preferred embodiment of the invention showing a trigger action pump in an unattended position.

FIGS. 1–6 show various views of a trigger action pump 10 for pumping a fluid such as liquid from a fluid container 11. The pump 10 is connected through a flange 14 having a tail piece 16 for receiving a dip tube 18 secured by friction or other means. The dip tube 18 extends to the bottom of the container 11 for drawing the fluid therein. The container 11 may have a screw cap 12 for securing the base 20 to the mouth of the container 11. A vent aperture 22 communicates with aperture 24 to vent the container 11 through collar internal aperture 50 of a collar 48, as will be hereinafter explained.

Figure 4:
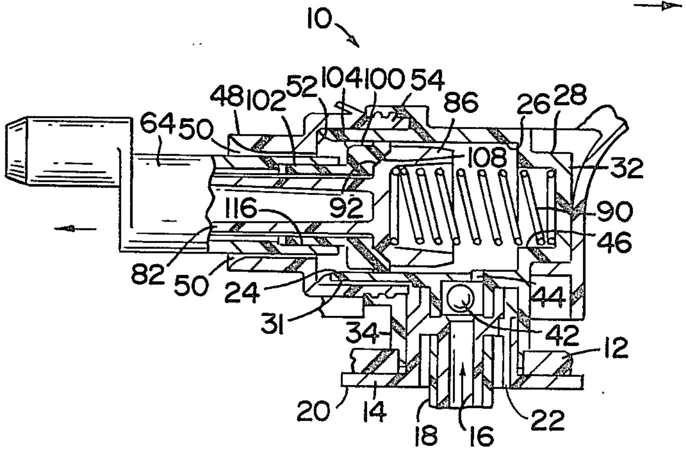
FIG. 4 is a partial view of the pump shown in FIG. 1 with the pump barrel and pump piston being moved toward the left by the force of the internal spring.
Figure 5:
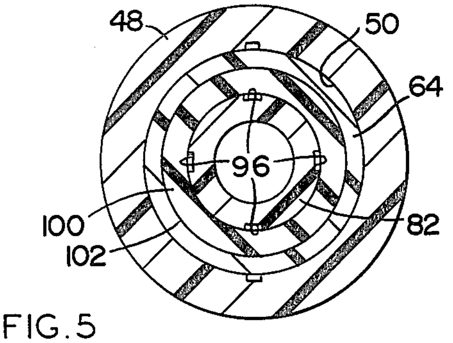
FIG. 5 is a sectional view along line 5—5 in FIG. 1.
Figure 6:
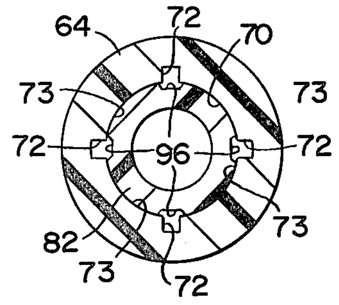
FIG. 6 is a sectional view along line 6—6 in FIG. 1.

The internal housing cylinder 26 extends through housing 28 and has a first and a second end 31 and 32. A base 34 of housing 28 receives the waist diameter 36 of the flange 14 with a housing valve projection 38 being received in the internal diameter of an upper annular ring 40 of flange 14. A check ball 42 is contained between the housing valve projection 38 and flange 14 to provide communication from dip tube 18 to the internal housing cylinder 26 through aperture 44 when check ball 42 is raised as shown in FIG. 4.

The housing 28 comprises a recess 46 located in proximity to the second end 32 of the housing internal cylinder 26. The first end 31 of cylinder 26 is shown substantially open for receiving the collar 48 having the collar internal aperture 50 with a cross-sectional area less than the cross-sectional area of the housing internal cylinder 26. The collar 48 forms a collar shoulder 52 when collar insert 54 is received within an annular slot 56 formed in the housing 28. The collar 48 also comprises ribs 58 rigidily extending out from the collar 48 to pivot a trigger 60 by an integral plastic hinge 62. The collar 48, ribs 58, trigger 60 and the integral plastic hinge 62 may be an integral structure formed from a single plastic part.

A pump barrel 64 is slidably received in the internal collar aperture 50 with a pump barrel tip 66 extending through an elongated aperture 68 in trigger 60. The pump barrel 64 includes an internal barrel bore 70 having a plurality of grooves 72 which define lands 73 more clearly shown in FIG. 6. The internal bore 70 communicates through a feed aperture 74 to a terminal orifice 76. A plurality of stops 78 extend from an end 80 of the pump barrel 64 to position a piston 82 as will be hereinafter described.

The piston 82 comprises a piston stem 84 and an enlarged piston head 86 having a cylindrical recess 88 for receiving bias means shown as a spring 90 interposed between recess 46 of the housing 28 and recess 88 of piston 82. Spring 90 urges the piston toward the left in FIG. 1 to the shown unattended position. The piston 82 includes a piston shoulder 92 established at the junction between the piston stem 84 and the enlarged piston head 86. The piston shoulder 92 has a radially extending portion 94 and a tapered portion 95. The piston stem 84 includes channel means shown as a plurality of channels or grooves 96 disposed about the piston stem 84 and extending along the length thereof.

The piston stem 84 is insertable within the internal barrel bore 70 of the pump barrel 64 with the stem 84 contacting lands 73 and with the end 98 of the piston stem 84 engaging the stops 78 of the pump barrel 64. The grooves 96 of piston 82 are shown aligned with the grooves 72 of the pump barrel 64 but it should be understood that the pump may operate with the grooves 72 and 96 adjacent or nonadjacent one another. The grooves 72 define lands 73 which position the piston stem 84 within the internal barrel bore 70.

Annular sealing means 100 preferably made of a rubber compound is slidably mounted relative to the pump barrel 64 and the piston 82 to seal the piston grooves 96 when the annular seal 100 is in a first position abutting the piston shoulder 92. The seal 100 enables fluid flow through the piston grooves 96 when the annular seal 100 is in a second position displaced from the piston shoulder 92. In this embodiment, the annular seal 100 comprises a sleeve portion 102 and a sealing member 104 with the sealing member having portions 106 and 108 for respectively abutting the portions 94 and 95 of the piston shoulder 92. Portion 110 seals against the internal diameter of the internal housing cylinder 26, whereas a rear portion 112 abuts the collar shoulder 52 when spring 90 urges the piston 82 to the left as shown in FIG. 1. Accordingly, the annular seal portions 106 and 108 abut piston shoulder portions 94 and 95 to seal fluid communication between the internal housing cylinder 26 and internal orifice 76.

The pump 10 as heretofore described may be fashioned from eight parts including flange 14, housing 28, collar assembly 48, pump barrel 64, piston 82, annular seal 100 and a hood 114. Annular projections 124 integrally extending from insert 54 of collar 48 are received in annular recesses 126 of slot 56 to secure the pump together against the urging of spring 90. The pump 10 shown in FIG. 1 is sealed to prevent spillage of the contents of the container 11 during shipment.

Figure 2:
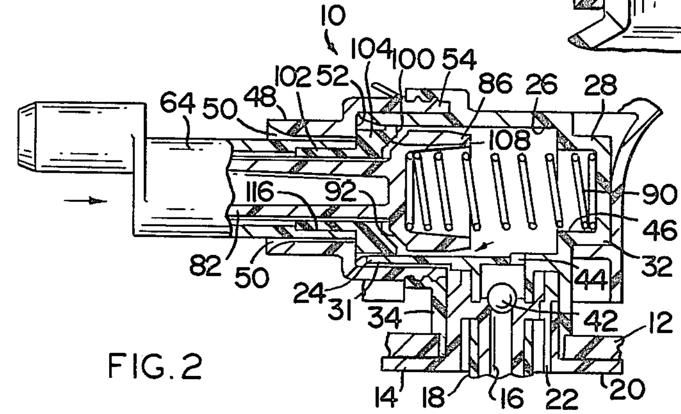
FIG. 2 is a partial view of the pump shown in FIG. 1 with the pump barrel and pump piston being moved toward the right during the initial stage of pump action.

FIG. 2 shows the result of initial pressure applied to the trigger 60 causing movement toward the right of the barrel 64 and piston 82. The annular seal 100 remains stationary with the sleeve portion 102 sliding into an annular seal bore 116. The displacement of the annular seal 100 from the piston shoulder 92 causes fluid communication between the internal housing cylinder 26 and the terminal orifice 76. Movement of piston 82 also pressurizes the internal housing cylinder 26 for providing pressure to dispense the fluid contained in the internal housing cylinder 26.

Figure 3:
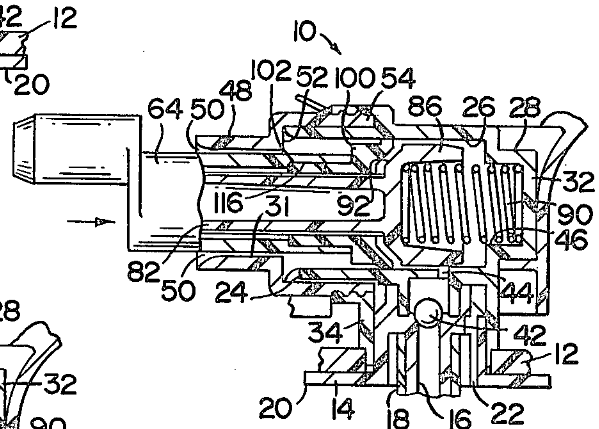
FIG. 3 is a partial view of the pump shown in FIG. 1 with the pump barrel and pump piston being moved substantially to the end of the pumping stroke.

FIG. 3 illustrates the position of the pump barrel 64, piston 82 and annular seal 100 at substantially the maximum stroke of the trigger 60. The annular seal 100 is still displaced from the piston shoulder 92 enabling continued dispensing of the fluid contained in the internal housing cylinder 26. It should be appreciated that vent aperture 22 communicates through aperture 24 and aperture 50 to vent container 11.

FIG. 4 illustrates the return of the pump barrel 64, piston 82 and annular seal 100 by action of spring 90. Initially, the piston 82 pushes pump barrel 64 toward the left in FIG. 4 with the annular seal 100 remaining stationary until sealing member 104 abuts piston shoulder 92 to seal piston grooves 96. Further return of the piston 82 raises check ball 42 for drawing fluid into the internal housing cylinder 26 from the container 11.

Figure 7:
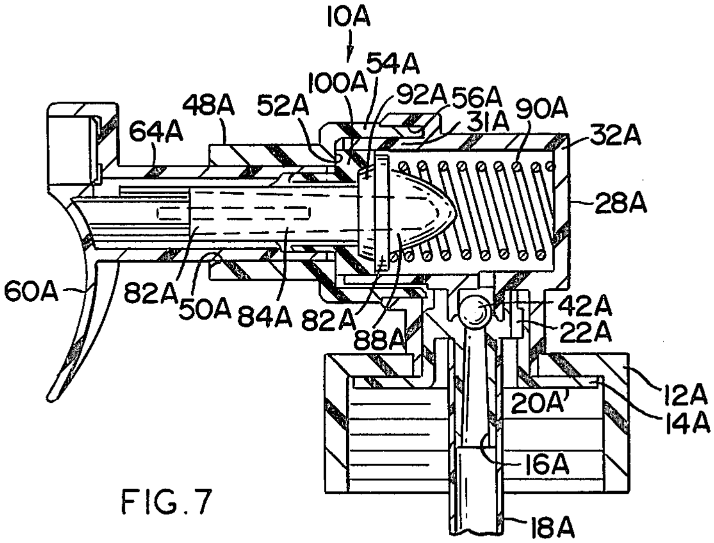
FIG. 7 is a first variation of the invention shown in FIGS. 1–6.

FIG. 7 is a modification of the invention as shown in FIG. 1 with similar parts being labeled with similar reference numerals followed by an A. In this embodiment, the trigger 60A is integrally formed with and moves linearly with the piston barrel 64A in the collar internal aperture 50A of collar 48A. The piston head 86A comprises a protrusion 88A instead of the recess 88 for positioning spring 90A in the housing 28A. The pump 10A operates substantially the same as the pump 10 shown in FIGS. 1–6.

Figure 8:
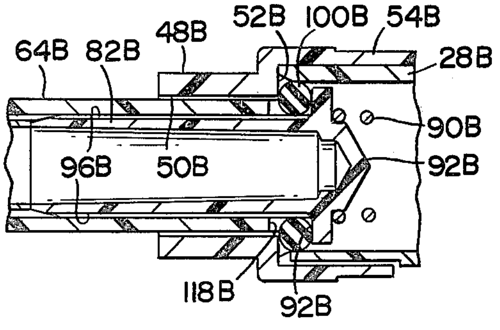
FIG. 8 is still a second variation of the invention shown in FIGS. 1 and 7 with an O-ring being located in a first position.
Figure 9:
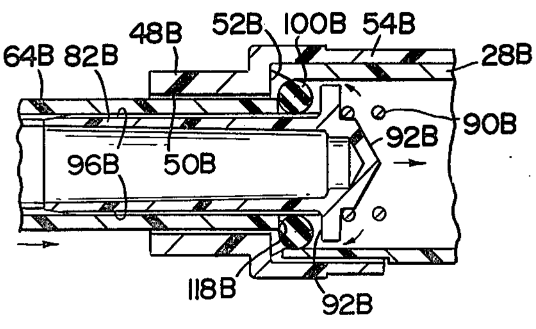
FIG. 9 is the second variation of the invention shown in FIG. 8 with the O-ring being in a second position.

FIGS. 8 and 9 illustrate a variation 100B of the annular seals 100 and 100A shown in FIGS. 1–7 and which may be incorporated into either of the embodiments shown in FIGS. 1 and 7. Similar parts are labeled with similar reference numerals followed by a B. In this embodiment, the annular seal 100B is an O-ring disposed between the end 118B of the pump barrel 64B and a piston shoulder 92B of a piston 82B. The O-ring 100B simultaneously abuts collar shoulder 52B and piston shoulder 92B for sealing the piston grooves 96B.

FIG. 9 illustrates movement of the pump barrel 64B and piston 82B toward the right displacing O-ring 100B from the piston shoulder allowing fluid communication between the internal housing cylinder and the terminal orifice as heretofore described.

Figure 10:
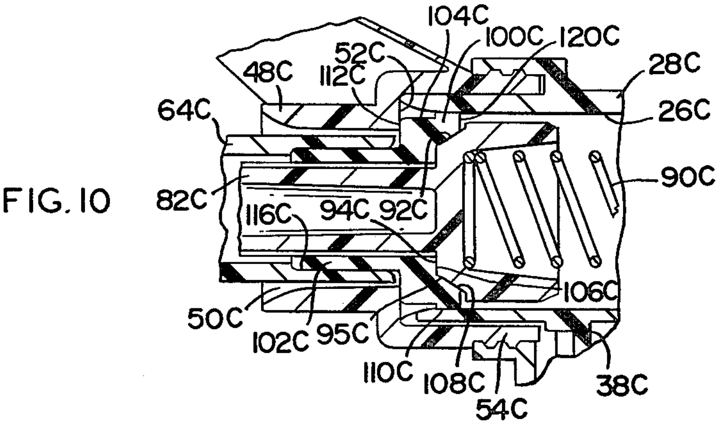
FIG. 10 is a third variation of the invention shown in FIGS. 1, 7 and 8 with the pump piston being in an unattended position.
Figure 11:
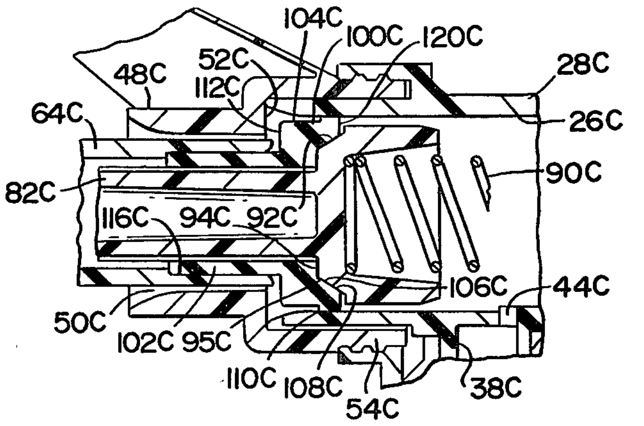
FIG. 11 illustrates the pump shown in FIG. 10 with the pump piston moved to a second position.
Figure 12:
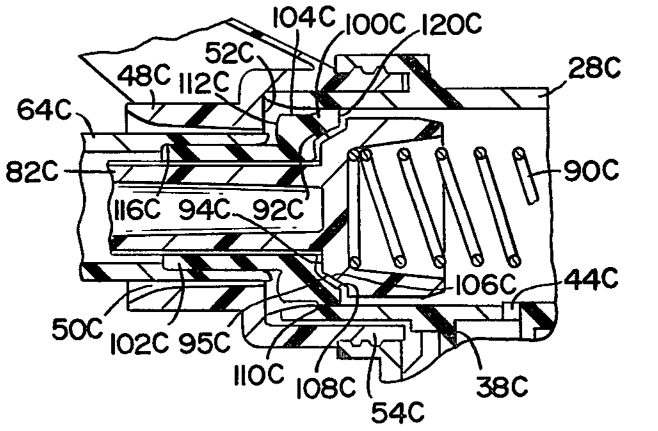
FIG. 12 illustrates the pump of FIGS. 10 and 11 with the annular seal displaced from the piston.

FIGS. 10–12 show a modification of the invention shown in FIG. 1 with similar parts labeled with similar reference numerals followed by a C. The annular seal means 100C is made of a rubber compound which is deformable when subjected to fluid pressure. In this embodiment, the annular seal comprises a sleeve portion 102C and a sealing member 104C, with the sealing member 104C having portions 106C and 108C for respectively abutting portions 94C and 95C of the piston shoulder 92C. Portion 110C seals against the internal diameter of the internal housing 26C whereas a rear portion 112C abuts the collar shoulder 52C when spring 90C urges the piston 82C to the left as shown in FIG. 10. The annular seal portions 106C and 108C abut piston shoulder portions 94C and 95C to seal fluid communication between the internal housing cylinder 26C and the terminal orifice (not shown). FIGS. 10–12 differ from FIG. 1 in that the annular seal bore 116C is commensurate in length with the sleeve portion 102C of the annular seal 100C. Accordingly, the annular seal 100C moves in accordance with the pump barrel 64C and the piston 82C.

FIG. 11 shows the results of initial pressure applied to the pump barrel 64C by a trigger or other means which causes movement toward the right of the barrel 64C, piston 82C and annular seal 100C. The annular seal 100C remains in contact with the piston 82C and more particularly, sealing member portions 106C and 108C respectively abut piston portions 94C and 95C. Concomitantly with the movement of pump barrel 64C, the fluid pressure builds within the housing cylinder 26C by virtue of the reduced volume therein. The pressure is exerted on surfaces 120C of the annular seal 100C to cause deformation of the sealing member 104C as shown in FIG. 12. Accordingly, the fluid pressure causes displacement of the annular seal 100C from the piston shoulder 92C to cause fluid communication between the internal housing cylinder 26C and the terminal orifice (not shown). Continued movement of pump barrel 64C further pressurizes the internal housing cylinder 26C for providing pressure to dispense the fluid contained in the internal housing cylinder 26C. If the fluid pressure within the housing 26C falls below the level required to deform the annular seal 100C, the seal returns to abut piston shoulder 92C, thereby terminating fluid communication between the internal housing cylinder 26C and the terminal orifice.

This modification ensures that a build-up of fluid pressure is present before fluid communication is established between the internal housing cylinder and the terminal orifice. Accordingly, fluid spray is eliminated during the weak pressure sections of a pump stroke, namely the initial section and the final section of the pump stroke. The pump produces a substantially uniform spray irrespective of the pump stroke. It should be understood that the invention shown in FIGS. 10–12 may be modified to incorporate a deformable O-ring seal in a manner similar to the invention shown in FIGS. 8 and 9.

Although the invention has been shown as a horizontal pump having either a pivoting or a linear trigger, it should be appreciated that the pump may be embodied in a vertical pump or otherwise. It should also be appreciated that the pumping action need not necessarily be associated with a trigger actuating element or the like.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention.

Now that the invention has been described:

What is claimed is:

1. A fluid spray pump primarily adapted for pumping a fluid from a fluid container, comprising in combination:

a housing comprising a housing internal cylinder having a first and a second end;

a collar established adjacent said first end of said housing internal cylinder having a collar internal aperture;

one way valve means connecting the fluid container to said housing internal cylinder;

a pump barrel slideably receivable in said internal collar aperture and including a barrel internal bore in communication with a terminal orifice in said pump barrel;

a piston comprising a piston stem and an enlarged piston head with said piston stem being receivable in said barrel internal bore of said pump barrel and with said pump head being receivable in said housing internal cylinder;

channel means for communicating said housing internal cylinder with said terminal orifice;

annular seal means movably mounted between a first and a second position for sealing said channel means when said annular seal means is in the first position and for enabling fluid flow through said channel means when said annular seal means is in the second position;

said annular seal comprising a single tubular sleeve and a sealing member;

said internal bore of said pump barrel including an internal annular seal bore for at least partially receiving therein the total single tubular sleeve portion of said annular seal means; and said annular seal bore of said pump barrel enabling said annular seal means to move within said internal annular seal bore relative to said pump barrel and said piston to provide fluid communication between said housing internal cylinder and said terminal orifice upon movement of said pump barrel and piston in a direction toward said second end of said housing internal cylinder.

2. A fluid spray pump as set forth in claim 1, including bias means coacting between said piston and said housing internal cylinder for biasing said piston toward said first end of said housing internal cylinder.

3. A fluid spray pump as set forth in claim 1, wherein said piston head forms a piston shoulder in proximity to the junction of said piston head and said piston stem; and said annular seal means sealing said channel means upon said sealing member abutting against said piston shoulder.

4. A fluid spray pump as set forth in claim 1, wherein said channel means includes a plurality of grooves extending into the outer surface of said piston stem.

5. A fluid spray pump as set forth in claim 1, including a substantially cylindrical recess established at said second end of said housing internal cylinder;

said piston head having a substantially cylindrical recess facing said second end of said housing internal cylinder; and spring means receivable in said cylindrical recesses for biasing said piston toward said first end of said housing internal cylinder.

6. A fluid spray pump as set forth in claim 1, including trigger means for sliding said pump barrel within said housing internal cylinder.

7. A fluid spray pump as set forth in claim 6, wherein said trigger is mounted for linear movement in accordance with the linear movement of said pump barrel.

8. A fluid spray pump as set forth in claim 6, wherein said trigger is pivotably mounted relative to said housing for providing a substantially linear movement to said pump barrel upon pivotable movement of said trigger.

9. A fluid spray pump as set forth in claim 1, wherein said oneway valve means includes a check ball adapted for only allowing fluid to enter said housing internal cylinder from the fluid container.

10. A fluid spray pump primarily adapted for pumping a fluid from a fluid container, comprising in combination:

a housing comprising a housing internal cylinder having a first and a second end;

a collar established adjacent said first end of said housing internal cylinder having a collar internal aperture;

one way valve means connecting the fluid container to said housing internal cylinder;

a rigid pump barrel slidably received and at least partially extending through said internal collar aperture;

said pump barrel including a barrel internal bore communicating with a terminal orifice in said pump barrel;

a piston comprising a piston stem and an enlarged piston head with said piston stem being receivable in said barrel internal bore of said pump barrel and with said pump head being receivable in said housing internal cylinder;

said piston head and said pump barrel forming a region therebetween enabling longitudinal movement of an O-ring seal abutting said piston head and said pump barrel;

channel means for communicating said housing internal cylinder with said terminal orifice; and annular seal means comprising said O-ring movably mounted between a first and a second position between said piston head and said pump barrel for sealing said channel means when said annular seal means is in the first position and for enabling fluid flow through said channel means when said annular seal means is in the second position.

11. A fluid spray pump as set forth in claim 1, wherein said one way valve means connects the fluid container to a sidewall of said housing internal cylinder.

12. A fluid spray pump primarily adapted for pumping a fluid from a fluid container, comprising in combination:

a housing comprising a housing internal cylinder having an open first end and a second end;

a collar established adjacent said first end of said housing internal cylinder and having an internal collar aperture forming a collar shoulder in proximity to said first end of said housing internal cylinder;

said internal collar aperture being of smaller cross-sectional area relative to said internal housing cylinder;

one way valve means connecting the fluid container to said housing internal cylinder in proximity to said second end;

a rigid pump barrel slidably received and extending outwardly of said housing from said internal collar aperture and including a barrel internal bore communicating with a terminal orifice in said pump barrel;

a rigid piston comprising a piston stem and an enlarged piston head with said piston stem being receivable in said barrel internal bore of said pump barrel and with said pump head being receivable in said housing internal cylinder;

said piston head forming a piston shoulder in proximity to the junction of said piston head and said piston stem;

channel means for communicating said housing internal cylinder with said terminal orifice;

annular seal means comprising a single tubular sleeve slidably mounted for sealing said channel means when said annular seal means abuts said piston shoulder and for enabling fluid flow through said channel means when said annular seal means is displaced from said piston shoulder;

bias means coacting between said piston and said second end of said housing internal cylinder for biasing said piston toward said first end of said housing internal cylinder to abut said annular seal means between said collar shoulder and said piston shoulder;

trigger means mounted relative to said pump barrel for sliding said pump barrel toward said second end of said housing internal cylinder thereby displacing said annular seal means from said piston shoulder to pump the fluid through said terminal orifice;

said annular seal comprising a sleeve with a sealing member extending radially outwardly at one end thereof;

said sealing member sealing said channel means upon said sealing member contacting said piston head;

said internal bore of said pump barrel including an internal annular seal bore for totally receiving at least part of said sleeve portion of said annular seal means;

stop means establishing the position of said piston relative to said pump barrel; and said annular seal bore of said pump barrel enabling said annular seal means to move within said internal annular seal bore relative to said pump barrel and said pistion to provide fluid communication between said housing internal cylinder and said terminal orifice only upon movement of said pump barrel and piston in a direction toward said second end of said housing internal cylinder.

13. A fluid spray pump as set forth in claim 12, wherein said channel means includes a plurality of grooves extending along and into the outer surface of said piston stem.

14. A fluid spray pump as set forth in claim 12, wherein said trigger is mounted for linear movement in accordance with the linear movement of said pump barrel.

15. A fluid spray pump as set forth in claim 12 wherein said trigger is pivotably mounted relative to said housing for providing a substantially linear movement to said pump barrel upon pivotable movement of said trigger.

16. A fluid spray pump primarily adapted for pumping a fluid from a fluid container, comprising in combination:

a housing comprising a housing internal cylinder having a first and a second end;

a collar established adjacent said first end of said housing internal cylinder having a collar internal aperture;

one way valve means connecting the fluid container to said housing internal cylinder;

a rigid barrel slidably received and extending outside of said housing from said internal collar aperture and including a barrel internal bore communicating with a terminal orifice in said pump barrel;

a rigid piston comprising a piston stem and an enlarged piston head with said piston stem being receivable in said barrel internal bore of said pump barrel and with said pump head being receivable in said housing internal cylinder;

channel means for communicating said housing internal cylinder with said terminal orifice;

annular seal means movably mounted between a first and a second position for sealing said channel means when said annular seal means is in the first position and for enabling fluid flow through said channel means when said annular seal means is in the second position;

said annular seal comprising a single tubular sleeve with a sealing member extending radially outwardly at one end thereof;

said sealing member sealing said channel means upon said sealing member contacting said piston head;

said internal bore of said pump barrel including an internal annular seal bore for at least partially receiving therein said single tubular sleeve portion of said annular seal means; and said annular seal bore of said pump barrel enabling said annular seal means to move within said internal annular seal bore relative to said pump barrel and said piston to provide fluid communication between said housing internal cylinder and said terminal orifice only upon movement of said pump barrel and piston in a direction toward said second end of said housing internal cylinder.

17. A fluid spray pump as set forth in claim 16 wherein said annular seal means is deformable upon fluid pressure within said housing internal cylinder for moving said annular seal means from said first to said second position.

18. A fluid spray pump primarily adapted for pumping a fluid from a fluid container, comprising in combination:

a housing comprising a housing internal cylinder having a first and a second end;

a collar established adjacent said first end of said housing internal cylinder having a collar internal aperture;

one way valve means connecting the fluid container to said housing internal cylinder;

a pump barrel slidably received and at least partially extending through said internal collar aperture;

a piston comprising a piston stem and an enlarged piston head with said piston stem extending from said pump barrel and with said pump head being receivable in said housing internal cylinder;

said piston head and said pump barrel forming a region therebetween enabling longitudinal movement of an O-ring seal abutting said piston head and said pump barrel;

channel means for communicating said housing internal cylinder with said terminal orifice; and annular seal means comprising said O-ring movably mounted between a first and a second position between said piston head and said pump barrel for sealing said channel means when said annular seal means is in the first position and for enabling fluid flow through said channel means when said annular seal means is in the second position.

19. A fluid spray pump primarily adapted for pumping a fluid from a fluid container, comprising in combination:

a housing comprising a housing internal cylinder having a first and a second end;

a collar established adjacent said first end of said housing internal cylinder having a collar internal aperture;

one way valve means connecting the fluid container to said housing internal cylinder;

a pump barrel slidably received and at least partially extending through said internal collar aperture;

a piston comprising a piston stem and an enlarged piston head with said piston stem extending from an end of said pump barrel and with said pump head being receivable in said housing internal cylinder;

said piston head and said pump barrel forming a region therebetween enabling longitudinal movement of an O-ring seal abutting said piston head and said pump barrel;

channel means for communicating said housing internal cylinder with said terminal orifice; and annular seal means comprising said O-ring movably received between a first and a second position between said piston head and said pump barrel on said piston stem for sealing said channel means when said annular seal means is in the first position and for enabling fluid flow through said channel means when said annular seal means is in the second position.

20. A fluid spray pump primarily adapted for pumping a fluid from a fluid container, comprising in combination:

a housing comprising a housing internal cylinder having an open first end and a second end;

a collar established adjacent first end of said housing internal cylinder and having an internal collar aperture forming a collar shoulder in proximity to said first end of said housing internal cylinder;

said internal collar aperture being of smaller cross-sectional area relative to said internal housing cylinder;

one way valve means connecting the fluid container to said housing internal cylinder in proximity to said second end;

a pump barrel slidably received and extending outwardly of said housing from said internal collar aperture;

a piston comprising a piston stem and an enlarged piston head with said piston stem extending from said pump barrel and with said pump head being receivable in said housing internal cylinder;

said piston head forming a piston shoulder in proximity to the junction of said piston head and said piston stem;

channel means for communicating said housing internal cylinder with said terminal orifice;

annular seal means comprising an O-ring received on said piston stem for sealing said channel means when said annular seal means abuts said piston shoulder and for enabling fluid flow through said channel means when said annular seal means is displaced from said piston shoulder;

bias means coacting between said piston and said second end of said housing internal cylinder for biasing said piston toward said first end of said housing internal cylinder; and trigger means mounted relative to said pump barrel for sliding said pump barrel toward said second end of said housing internal cylinder thereby displacing said annular seal means from said piston shoulder to pump the fluid through said terminal orifice.

* * * * *